United States Patent [19]

Schleiffarth

[11] Patent Number: 4,834,889

[45] Date of Patent: May 30, 1989

[54] OIL AND WATER FILTER AND PROCESS FOR DEWATERING OIL SLUDGE

[75] Inventor: James W. Schleiffarth, Kirkwood, Mo.

[73] Assignee: Oil Recovery Systems Inc., Webster Groves, Mo.

[21] Appl. No.: 312

[22] Filed: Jan. 5, 1987

Related U.S. Application Data

[63] Continuation of Ser. No. 343,481, Jan. 28, 1982, abandoned.

[51] Int. Cl.$^4$ .............................................. B01D 17/05
[52] U.S. Cl. .................................. 210/708; 210/724; 210/726; 210/778
[58] Field of Search ............... 210/708, 714, 777, 778, 210/724, 726, 799

[56] References Cited

U.S. PATENT DOCUMENTS 2,665,813  1/1954  Bollaert et al. .................... 210/778
3,835,021  9/1974  Lorenz et al. ...................... 210/774

Primary Examiner—Ivars Cintins
Attorney, Agent, or Firm—Gravely, Lieder & Woodruff

[57] ABSTRACT

This disclosure concerns a composition and process for separating solids from an oil and water mixture. The composition comprises lime and calcined perlite of a size distribution such than 0–5% is retained on 30 mesh, 45–65% is retained on 50 mesh, 80–90% is retained on 100 mesh and 90–100% is retained on 200 mesh screens. The process is particularly applicable to separating solids from an oily sludge to produce a recoverable oil product and a non-leaching filter cake which is environmentally acceptable.

11 Claims, 2 Drawing Sheets

OIL AND WATER FILTER AND PROCESS FOR DEWATERING OIL SLUDGE

This is a request for filing a continuation application under 37 CFR 1.60, of pending prior application Ser. No. 343,481 filed on Jan. 28, 1982, now abandoned.

BACKGROUND OF THE INVENTION

This invention relates to a composition for mixing with an oil and water mixture to allow it to be filtered through a pressure filter press to remove solids and specifically relates to the dewatering of petroleum oil sludges. The invention will be described in detail in its specific relation to a process for treating oil sludges with hydrated lime and calcined perlite so that the treated sludge can be passed through a diatomateous earth coated filter press and the filtered oil and water thereafter separated by gravity. The solids are removed in the filter cake which is non-leaching and meets environmental protection standards for disposal in non-hazardous waste disposal areas.

The composition of this invention comprises a filter aid of hydrated lime and calcined perlite of a specific size distribution.

Presently, dewatering of petroleum oil sludges is a major problem in places such as refineries, oil production fields, barge and tanker lines, oil pipeline and oil marketing terminals.

In the production of oil from an oil well, the oil often will flow to the surface from natural pressure during the first portion of the life of the well. However, after a certain period of pumping oil from the well, water must be forced into the formation to keep oil flowing from the well. A mixture of oil and water then is pumped from the well and this goes to a series of tanks and settling basins where as much of the oil as possible is removed for processing. Some of the oil and water is not separated and remains in the settling basin as sludge.

When the well is abandoned, the settling basins also are abandoned. There is a certain amount of usable oil in these basins which it would be desirable to recover for processing as the price of crude increases. Also government is continually increasing the strictness of pollution laws and certain states require elimination of a fixed percentage of the settling basins each year. To eliminate these, a method of separating the oil from the sludge must be utilized or the entire mass must be disposed of in some manner. With tighter controls on solid waste disposal, suitable dump sites are limited.

Even when the oil is separated from the sludge, disposal problems for the solids exist, because the solids must be a non-leaching mass so that pollution of the soil and ground water in later years is avoided. These problems exist in other areas such as refineries and terminals for oil and oil products.

Presently, several methods of treating oily sludges are used, but all have certain drawbacks and difficulties inherent in their use. It is conventional in the art to mix sludge and certain chemicals in a tank and pass the treated sludge through a pre-coated filter press.

One of the chemicals used to treat the sludge is 20-100% lime (based on the dry solids of the sldudge) in the form of a milk of lime solution. With this treatment, some sludges can be properly conditioned and then dewatered with a pressure filter. However, when massive doses of lime are required, the net amount of sludge dewatered is reduced, thereby making the process uneconomical.

Another method presently used is to condition the raw sludge with 2.5-10% ferric chloride prior to adding lime in an amount of 10-40% by weight of dry sludge solids. Typically, this is approximately 400 mg ferric chloride per liter of sludge coupled with the milk of lime addition needed to adjust pH from between 8 to 11. Ferric chloride is used to reduce the amount of lime required. The ferric chloride forms a floc which is unstable on the acid side. Lime stabilizes the floc and adds filter cake body. Sludge conditioned in this matter can be processed by pressure filtration. This process is particularly useful where biological solids are present and oil concentrations are low. However, the ferric chloride is expensive and the process is not suitable in many sludge conditions.

Use of a heat treatment step in combination with the addition of polymers or lime also is used. When the additive is a polymer, the polymer is added to the sludge in a conditioning tank prior to 24-hour heat treatment of the sludge to effect a solids settling. After settling has occurred, oil is decanted and reclaimed off the top of the conditioning tank. The settled sludge solids are disposed of by various methods.

When heat treatment is combined with a lime addition, the amount of lime required is reduced. The sludge is heat treated, often in conjunction with pH adjustment, prior to the addition of lime. The amount of lime added after heat treatment ranges from 10-40% by weight of dry sludge solids and is introduced in a milk of lime solution. Heat treatment alters the flow characteristics of the sludge affecting a more efficient oil/water from solids separation under pressure filtration.

In either of the processes using heat treatment, the amount of energy required is excessive and makes the process uneconomical.

A final process used to clean up a sludge is to add conventional body feeds or bulking agents, such as diatomaceous earth and fly ash, to increase porosity and add filter cake body under pressure filtration.

These processes have the disadvantage that massive doses are required (as much as 1 pound per gallon of sludge). This makes the process uneconomical. Another disadvantage is that diatomaceous earth and fly ash will often coat and blind with oil.

One of the principal objects of this invention is to provide a filter aid for use with pressure filters in treating oil and water mixtures wherein the solids are separated from the oil and water which then can be separated by decantation. The filter aid is a combination of lime and calcined perlite of specific size distribution.

Another principal object of this invention is to provide a universal method of conditioning oily sludge prior to pressure filtration, thereby effecting an economical method of recovering oil and producing a non-leaching well consolidated filter cake which can be disposed of safely.

Still another object is to provide a method of treating sludge concurrently or sequentially with lime and calcined perlite of a defined size distribution whereby the treated sludge, when passed through a pressure filter, will have the solids separated from the oil and water, and the oil can be separated by decantation from the recovered filtrate.

These and other objects and advantages will become apparent hereinafter.

SUMMARY OF THE INVENTION

The present invention comprises a composition of lime and calcined perlite of defined sized composition for use as a filter aid in treating oil and water mixtures in a pressure filter and further comprises a method of treating oily sludge with lime and calcined perlite to condition the sludge before it is passed through a pressure filter where the solids are retained in the filter cake and the oil is recovered from oil and water in the filtrate.

DRAWINGS

FIG. 1 is a schematic flow chart representing broadly the process of this invention; and FIG. 2 is a schematic flow chart representing the process of this invention specifically applied to a raw oily sludge.

DETAILED DESCRIPTION

Figure 1:
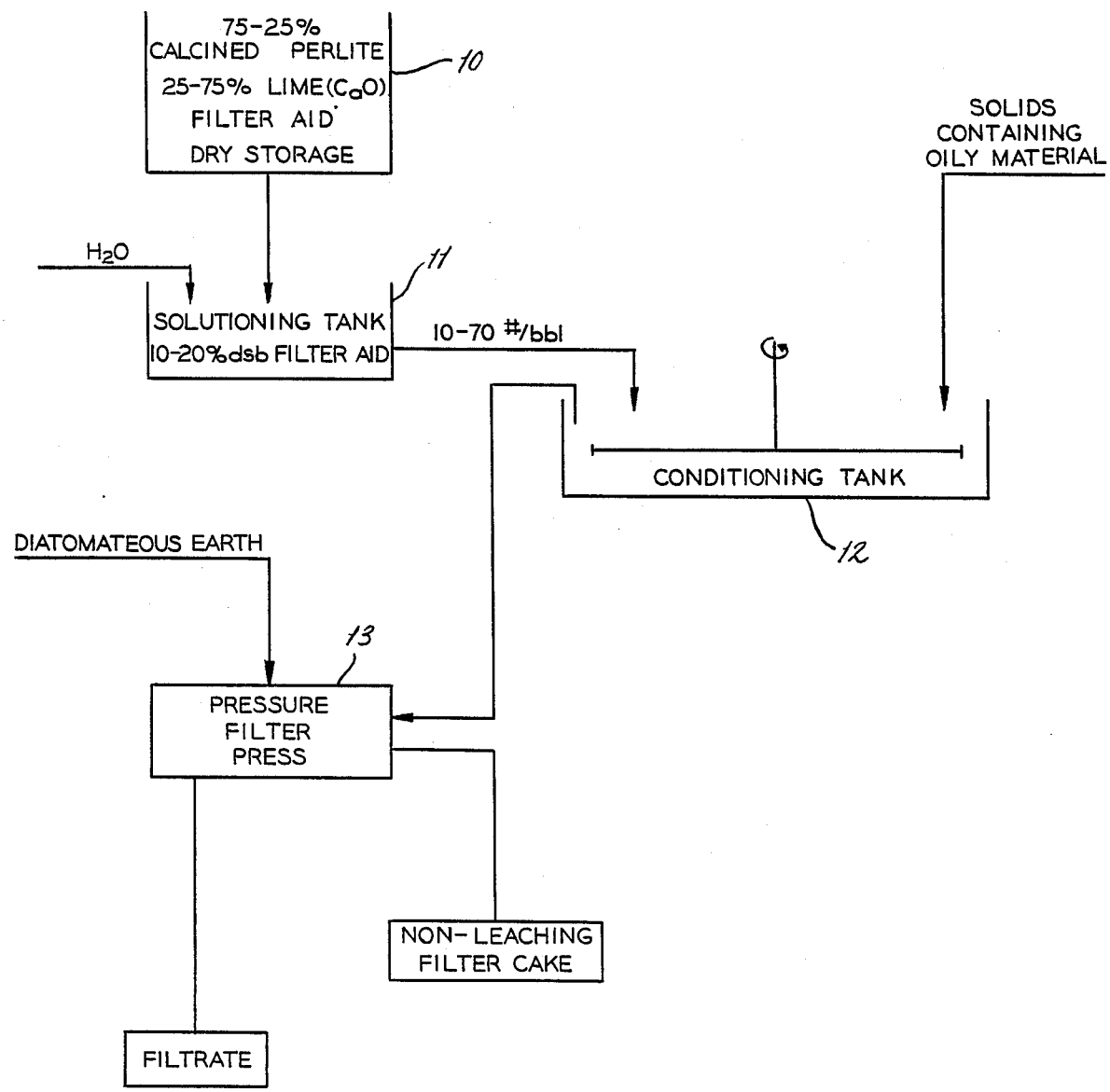

FIG. 1 shows the broad application of this invention to an oil and water mixture before said mixture is passed through a pressure filter where the solids are removed.

The unique filter aid of this invention comprises about 25 to about 75% hydrated or slaked lime and about 75 to about 25% calcined perlite. These percentages are by weight on a dry solids basis. The numeral 10 represents this composition in storage. The filter aid is mixed with water in a solutioning tank 11 in about 10 to 20% by weight mixture.

The filter aid and water mixture then is mixed in a conditioning tank 12 with an oil material containing solids. Among suitable products are vegetable oil, oil sludge, grease sludge, and animal manure. The filter aid is mixed with the oily material in an amount of about 10 to about 70 lbs. per barrel of oil-bearing material on a dry solids basis. The mixing time and temperature vary depending on the material being treated, but about 20 minutes usually is satisfactory.

The mixture of filter aid and oil and water then is passed through a recessed plate filter press 13 which has been precoated in a conventional manner with diatomaceous earth. The filter 13 separates the material being treated into a non-leaching filter cake and a filtrate containing the oily material and water. These can then be separated on standing by decantation.

Figure 2:
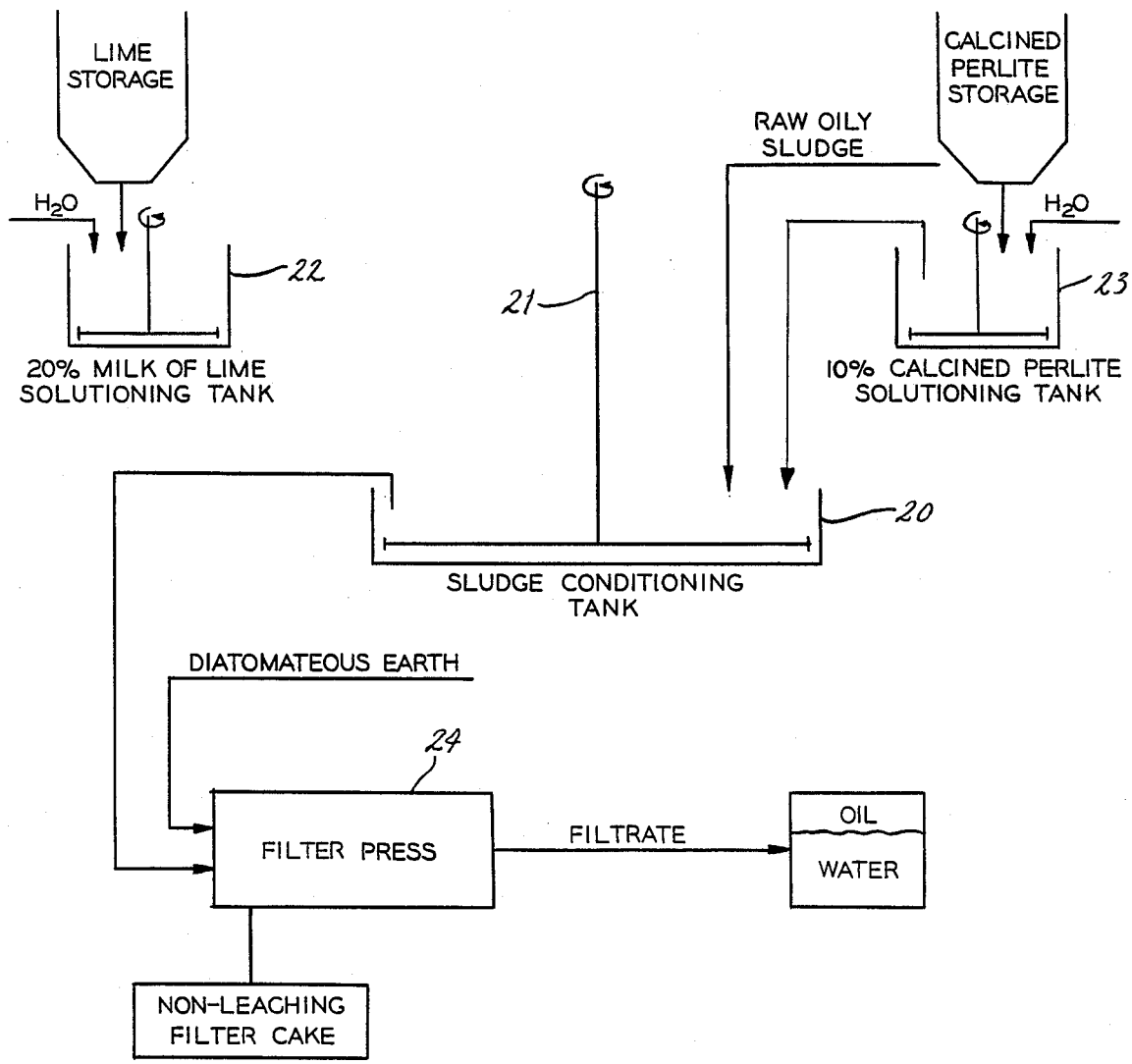

FIG. 2 of the flow diagrams shows the application of this invention to an oily sludge from a refinery, oil field settling basin, or the like. The oily sludge is pumped into a sludge conditioning tank 20 which is equipped with a suitable agitator 21. At the same time a milk of lime mix is prepared in a lime tank 22. The milk of lime solution is made at a 20% solids level for convenience, but can be from 5 to 30% solids. The higher the solids level, the less water is later introduced into the conditioning tank and the less that has to be separated in the filter press.

Lime is fed into the lime tank 22 where it is mixed with water into a milk of lime mixture. The lime is in the slaked or hydrated condition in storage.

The milk of lime is added to the oily sludge in the sludge tank 20 until there are about 5 to about 30 pounds of dry lime per barrel of sludge. Preferably about 14 pounds of dry lime per barrel of sludge are used.

The lime raises the pH of the oily sludge to about a pH of 11, thereby conditioning the sludge and neutralizing any hazardous wastes in the sludge. The lime also adds body to the filter cake when the mixture is filtered later.

The lime and sludge mixture is agitated for about 20 minutes until the lime is thoroughly dispersed throughout the sludge.

A mixture of highly calcined perlite is mixed with water in a perlite tank 23. The perlite is mixed at about 5 to about 20% solids, preferably about 10% solids. As mentioned, the perlite is calcined and a suitable type is CASTOCEL LT 30 made by J. J. Brouk of St. Louis, Mo. The perlite is calcined by heating to a temperature of about 1705° F. (below the fusion point) until the water in the perlite is released.

The type and size distribution of the perlite is critical to the proper functioning of the invention. I have tried uncalcined perlite and perlite of −88 mesh and fines, and these do not work properly in this invention.

The perlite has the following characteristics:

PHYSICAL CHARACTERISTICS:
  Chemically inert
  Insoluble in most solvents
  Fusion point of 2300° to 2450° F.
  Specific Gravity of 2.2 to 2.4
  Electrically non-conductive
  Physically stable
  PH of 6.6 to 8.0
  Specific Heat of 0.20

SCREEN ANALYSIS:
  0–5% on 30 Mesh
  45–65% on 50 Mesh
  80–90% on 100 Mesh
  90–100% on 200 Mesh

| TYPICAL CHEMICAL ANALYSIS: | |
| --- | --- |
| Silicon dioxide, $SiO_2$ | 70.0% |
| Aluminum oxide, $Al_2O_3$ | 19.5% |
| Potassium oxide, $K_2O$ | 4.0% |
| Sodium oxide, $Na_2O$ | 4.2% |
| Calcium oxide, CaO | 0.24% |
| Ferric oxide, $Fe_2O_3$ | 0.76% |
| Magnesium oxide, MgO | 0.06% |
| Titanium dioxide, $TiO_2$ | 0.05% |
| Molybdenum, Mo | Trace |
| Total chlorides | Trace |
| Ignition loss | 0.09% |
| Manganese dioxide, $MnO_2$ | 0.20% |
| Sulphur trioxide, $SO_3$ | Trace |
| Chromium, $Cr_2O_3$ | 0.00054% |
| Barium, BaO | Nil |
| Nickel oxide, NiO | Trace |
| Copper, CuO | 0.0094% |
| Boron, $B_2O_3$ | 0.0048% |
| Beryllium, BeO | 0.0050% |
| Lead oxide, PbO | 0.015% |
| Total sulphates | Nil |
| Free silica | Nil-2.0% |

In a preferred process, a 10% solution of the highly calcined, aluminum-silicate perlite aggregate of volcanic origin generated in the tank 23 is dispersed into the lime conditioned sludge in the sludge conditioning tank 20 at 5–40 pounds of dry perlite aggregate per barrel of sludge.

If desired, the lime conditioned sludge can be moved to a second holding and mixing tank for the perlite addition. In either process, the perlite mixture is agitated with the lime conditioned sludge for about 10 minutes until the perlite is thoroughly distributed throughout the lime conditioned sludge. If the lime and perlite are mixed in at the same time a total of 20 minutes mix time is sufficient.

While FIG. 2 shows the lime and calcined perlite being added concurrently to the sludge, they can be added sequentially as described or they can be added in the form of a composition of perlite and lime as described in FIG. 1.

The perlite aggregate is used to increase filter cake body porosity as a body feed to allow more efficient oil/water from solids separation by resisting oil/water penetration into the individual perlite particles except for surface absorbtion.

The lime and perlite treated sludge is passed to the filter press 24 coated with diatomaceous earth. The conditioned sludge is filtered and dewatered under 75-225 PSI consolidation pressure in the recessed plate filter press 24 pre-coated with diatomaceous earth to remove solids in the form of a well-consolidated, non-leaching filter cake.

The oil portion of the oil/water filtrate is recovered from a reservoir by decanting. The oil separates naturally from the water and floats on the water where it can be removed easily.

The diatomaceous earth is solutional to provide 1.5 times the volume of the press and inlet piping at 10 lbs/100 ft$^2$ of dry diatomaceous earth per filter area. This is a standard pre-coating procedure.

The standard for Environmental Protection Test procedures is set forth in Fed. Register, Vol. 45, No. 98, May 19, 1980 pgs 33119-33133 as amended Fed. Register, Vol. 45, No. 212, Oct. 30, 1980 pgs. 72032-72034. The filter cake from this invention meets these standards.

Following are specific examples of the preferred methods of practicing this invention:

EXAMPLE NO. 1

Sludge Source: American Petroleum Institute (API) Separator Bottoms composed of 20% by weight solids, 30% oil, 50% water

| Sludge Chemical Treatment: | |
|---|---|
| 1 lb. lime (20% solution) <br> 1 lb. Perlite (10% solution) | 3 gals. sludge |

Precoat: 10 lbs/100 ft$^2$ Eagle Picher (EP) FW4 diatomaceous earth
Filter Cloth: monofilament polypropylene media with a rating of 30 CFM at ½" water gauge

| TIME | FLOW | PSI (Chamber Pressure) |
|---|---|---|
| 9:07 | Start | 40-80 |
| 9:08 | 750 ml/m | 100 |
| 9:10 | 200 | 100 |
| 9:15 | 100 | 100 |
| 9:20 | 68 | 100 |
| 9:30 | 47 | 100 |
| 9:45 | 36 | 100 |
| 10:00 | 30 | 100 |
| 10:15 | 26 | 100 |
| 10:30 | 20 | 100 |
| 10:45 | 16 | 100 |
| 11:00 | 10 | 100 |
| 11:07 | Stop | 100 |

2 hour cycle
Cake Release: 100%  pH Filtrate: 12.5
Weight of one cake: 3 lbs. 6 oz.
Cake Density: 71.8 lbs/ft$^3$
Cake Thickness: 1"
Cake % Solids: 59.9%
Cake % Oil: 12.7%
Cake % Water: 27.4%

When the flow is 10 ml/m the cake is assumed to be firm. The perlite is LT30 by J. J. Brouk.

EXAMPLE NO. 2

Sludge Source: API Separator Bottoms composed of 20% by weight solids including coke fines, 30% oil, 50% water.

| Sludge Chemical Treatment: | |
|---|---|
| 1 lb. lime (20% solution) <br> 1 lb. LT30 (105 solution) | 3 gals. sludge |

Precoat: 10 lbs/100 ft$^2$ EP FW4 diatomaceous earth
Filter Cloth: monofilament polypropylene at 30 CFM

| TIME | FLOW | PSI (Chamber Pressure) |
|---|---|---|
| 11:50 | Start | 20-60 |
| 11:52 | 1000 ml/m | 40-80 |
| 11:55 | 230 | 100 |
| 12:00 | 138 | 100 |
| 12:15 | 48 | 100 |
| 12:30 | 14 | 100 |
| 12:45 | 7 | 100 |
| 12:55 | 5 Stop | 100 |

1 hr-5 min cycle
Cake Release: 100%  pH Filtrate: 12.5
Weight of one cake: 3 lbs. 4 oz.
Cake Density: 69.15 lbs/ft$^3$
Cake Thickness: 1"
Cake % Solids: 60.39%
Cake % Oil: 15.3%
Cake % Water: 24.31%

EXAMPLE NO. 3

Sludge Source: Lagoon Bio-Solids a refinery sludge composed of 35% solids by weight, 5% oil, 60% water

| Sludge Chemical Treatment: | |
|---|---|
| 1 lb. lime (20% solution) <br> 1 lb. LT30 (10% solution) | 3 gals. sludge |

Precoat: 10 lbs/100 ft$^2$ EP FW4 diatomaceous earth
Filter Cloth: monofilament polypropylene at 30 CFM

| TIME | FLOW | PSI (Chamber Pressure) |
|---|---|---|
| 1:35 | Start | 40-80 |
| 1:36 | 800 ml/m | 100 |
| 1:40 | 120 | 100 |
| 1:45 | 64 | 100 |
| 2:00 | 20 | 100 |
| 2:20 | 5 Stop | 100 |

45 min cycle
Cake Release: 100%
Weight of one cake: 3 lbs. 8 oz.
Cake Density: 74.5 lbs/ft$^3$
Cake Thickness: 1"
Cake % Solids: 53.8%
Cake % Oil: 12.6%
Cake % Water: 33.6%

EXAMPLE NO. 4

Sludge Source: Accumulated Lagoon Sludge generated from oily tank bottoms

| Sludge Chemical Treatment: | |
|---|---|
| 1 lb. lime (20% solution) | } 3 gals. sludge |
| 1 lb. LT30 (10% solution) | |

Precoat: 10 lbs/100 ft² EP FW4 diatomaceous earth
Filter Cloth: monofilament polypropylene at 30 CFM

| TIME | FLOW | PSI (Chamber Pressure) |
|---|---|---|
| 9:05 | Start | 20-60 |
| 9:06 | 150 ml/m | 80 |
| 9:10 | 70 | 100 |
| 9:20 | 50 | 100 |
| 9:30 | 48 | 100 |
| 9:43 | 32 | 100 |
| 10:00 | 30 | 100 |
| 10:35 | 20 | 100 |
| 11:05 | 18 | 100 |
| 11:35 | 16 | 100 |
| 12:05 | 8 Stop | 100 |

3 hour cycle
Cake Release: Good; however cake had a soft core 3" φ × ⅛" thick
Cake Weight: 2 lbs. 13 oz.      pH Filtrate: 13
Cake Density: 59.8 lb/ft³
Cake Thickness: 1"
Cake % Solids: 48.7%
Cake % Oil: 22.7%
Cake % Water: 28.6%

EXAMPLE NO. 5

Sludge Source: Accumulated Lagoon Sludge

| Sludge Chemical Treatment: | |
|---|---|
| 1 lb. lime (20% solution) | } 3 gals. sludge |
| 1½ lbs. LT30 (10% solution) | |

Precoat: 10 lbs/100 ft² EP FW4 diatomaceous earth
Filter Cloth: monofilament polypropylene 30 CFM

| TIME | FLOW | PSI (Chamber Pressure) |
|---|---|---|
| 2:20 | Start | 40-80 |
| 2:21 | 480 ml/m | 100 |
| 2:30 | 90 | 100 |
| 2:40 | 77 | 100 |
| 3:00 | 38 | 100 |
| 3:20 | 15 | 100 |
| 3:30 | 9 | 100 |
| 3:50 | 5 Stop | 100 |

1 hour-30 min cycle
Cake Release: 100%      pH Filtrate: 13
Cake Weight: 2.75 lbs.
Cake Density: 58.5 lbs/ft³
Cake Thickness: 1"
Cake % Solids: 46.3%
Cake % Oil: 20.1%
Cake % Water: 33.6%

This example shows decreased oil in the filter cake resulting from an increased amount of perlite in the filter aid. The time of the cycle also is reduced by the additional perlite in the filter aid. Typical sludge is 10-20% solids and refinery 10-40% oil.

What is claimed is:

1. A process of separating solids from oily sludge consisting essentially of the steps of
   (a) treating an oily sludge with lime,
   (b) treating the lime treated oily sludge with calcined perlite having a size distribution of about 0% to about 5% on 30 mesh, about 45% to about 65% on 50 mesh, about 80% to about 90% on 100 mesh and about 90% to about 100% on 200 mesh, and
   (c) separating the solids from the oil and water.

2. The process of claim 1 wherein said separating includes passing the lime and calcined perlite treated sludge through a pre-coated recessed plate filter press at a pressure of about 75 to about 225 PSI.

3. The process of claim 2 wherein the calcined perlite is principally silicon dioxide and aluminum oxide of about 2.2 to about 2.4 specific gravity and a fusion point of about 2300° F. to about 2450° F.

4. The process of claim 2 wherein the press is precoated with diatomaceous earth.

5. The process of claim 1 wherein about 5 to about 30 pounds of lime per barrel of sludge is used.

6. The process of claim 5 wherein the lime is in the form of milk of lime.

7. The process of claim 1 wherein from about 5 to about 40 pounds of dry perlite aggregate per barrel of sludge is added to the limed sludge.

8. The process of claim 1 wherein the oily sludge is raised to a pH of about 11.

9. A process of separating solids from oily sludge consisting essentially of the steps of:
   (a) treating an oily sludge with milk of lime in an amount of about 5 to about 30 pounds of lime per barrel of sludge,
   (b) treating the lime treated oily sludge with calcined perlite in an amount of about 5 to about 40 pounds of dry perlite per barrel of sludge, said calcined perlite having a size distribution of about 0% to about 5% on 30 mesh, about 45% to about 65% on 50 mesh, about 80 to about 90% on 100 mesh, and about 90 to 100% on 200 mesh, said calcined perlite being principally silicon dioxide and aluminum oxide of about 2.2 to about 2.4 specific gravity and having a fusion point of about 2300° F. to about 2450° F.,
   (c) separating the solids from the oil and water, and
   (d) separating the oil from the water.

10. The process of claim 9 wherein said separating the solids includes passing the lime and calcined perlite treated sludge through a recessed plate filter press pre-coated with diatomaceous earth at a pressure of about 75 to about 225 PSI, and the oil and water are in the filtrate.

11. A process of separating solids from oily sludge consisting essentially of the steps of
    (a) treating an oily sludge concurrently with lime, and calcined perlite having a size distribution of about 0% to about 5% on 30 mesh, about 45% to about 65% on 50 mesh, about 80% to about 90% on 100 mesh and about 90% to about 100% on 200 mesh, and
    (b) separating the solids from the oil and water.

* * * * *